Sept. 9, 1969   C. I. BROWN   3,465,437

VEGETABLE PEELER WITH MATERIAL RECEIVING OPENING

Filed Oct. 30, 1967

INVENTOR
Charles Ira Brown

BY *Shoemaker and Mattare*

ATTORNEYS

United States Patent Office 3,465,437
Patented Sept. 9, 1969

3,465,437
VEGETABLE PEELER WITH MATERIAL RECEIVING OPENING
Charles Ira Brown, 727 Ridge Road, Smoke Rise, Kinnelon, N.J. 07405
Filed Oct. 30, 1967, Ser. No. 679,046
Int. Cl. B26b 3/00
U.S. Cl. 30—279                          1 Claim

ABSTRACT OF THE DISCLOSURE

A solid one-piece handle portion is provided with a longitudinally extending hole formed therethrough opening through opposite ends thereof. A blade portion includes a connecting portion extending through one open end of the hole in the handle portion, the blade portion being interconnected with the handle portion through a pin and enlarged hole interconnection which provides a lost motion connection enabling relative rotation through a specified arc of the blade portion with respect to the handle portion.

Background of the invention

The present invention relates to a peeler of the type employed with vegetables such as potatoes and carrots to peel off thin layers of the integuments thereof or for slicing and shredding vegetables such as lettuce or cabbage and the like.

A disadvantage of prior art peelers of this type is the fact that the handle portions thereof have been of such a construction that they readily slip with respect to a user's hand which of course is quite undesirable.

In prior art floating blade arrangements wherein the blade portion is supported by solid handles formed of plastic and the like, adequate means has not been provided for effectively cleaning the device at the point where the blade portion is movably connected with the handle portion.

Summary of the invention

The present invention provides a lost motion connection between the handle portion and the blade portion which enables the blade portion to rotate through a specified arc with respect to the handle portion there by enabling the blade portion to readily conform to the outer configuration of different shaped items.

The handle portion of the present invention comprises a solid one-piece construction having an outer surface which is other than circular and is provided with a plurality of longitudinally extending recesses which are adapted to be manually grasped and which serve to prevent slipping of the handle with respect to a user's hand.

The blade portion of the present invention is connected with the handle portion with a longitudinally extending hole provided through the handle portion. This longitudinally extending hole opens through opposite ends of the handle portion thereby enabling effective cleaning of the device throughout its length so as to allow peeling particles to be washed away from the lost motion connection between the handle portion and the blade portion and ensuring that a sanitary arrangement is provided.

An object of the present invention is to provide a new and novel vegetable peeler wherein the blade portion is of the floating type with respect to the handle portion and wherein the blade portion is mounted on the handle portion in a unique manner to enable relative rotation of the blade portion with respect to the handle portion through a specified arc, and wherein a most economical means of securing the blade portion to the handle portion is provided; wherein the handle portion of the device will not slip with respect to a user's hand; and further wherein means is incorporated in the structure to enable effective cleaning of the entire device and particularly the point of interconnection between the handle portion and the blade portion.

Description of the preferred embodiment

Figure 1:
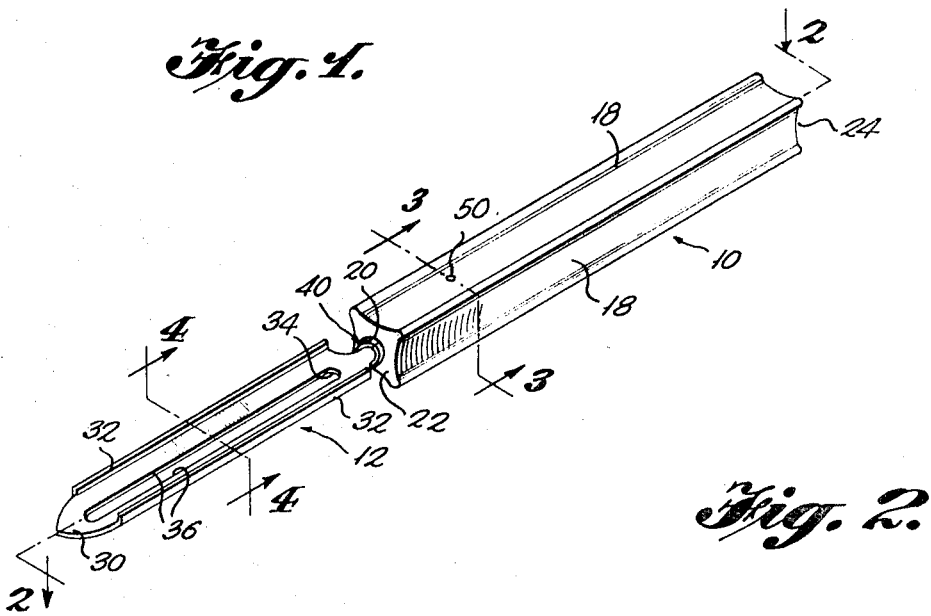
FIG. 1 is a top perspective view of a vegetable peeler according to the present invention.

Referring now to the drawing wherein like reference characters designate corresponding parts throughout the several views, the vegetable peeler of the present invention includes a handle portion indicated generally by reference numeral 10 and a blade portion indicated generally by reference numeral 12.

Figure 3:
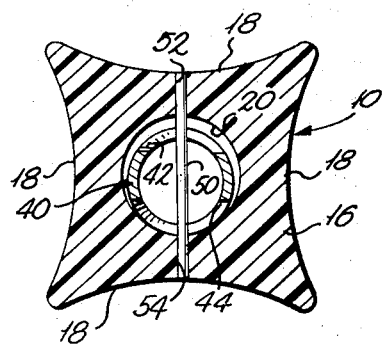
FIG. 3 is a sectional view on an enlarged scale taken substantially along line 3—3 of FIG. 1 looking in the direction of the arrows.

The handle portion is preferably of a one-piece construction and may comprise a length of extruded plastic material of a suitable type. The handle portion includes a body means 16 formed of plastic which is of generally rectangular cross-sectional configuration as seen in FIG. 3 and is provided with four arcuate elongated extending recesses 18 in the four sides thereof as seen in this figure.

Figure 2:
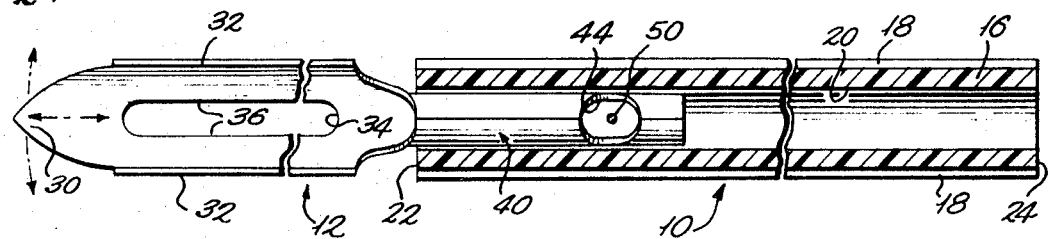
FIG. 2 is a sectional view on an enlarged scale taken substantially along line 2—2 of FIG. 1 looking in the direction of the arrows and being partly broken away.

As seen most clearly in FIG. 2, an elongated substantially cylindrical hole 20 extends longitudinally of the handle portion and opens through the opposite ends 22 and 24 thereof.

Figure 4:
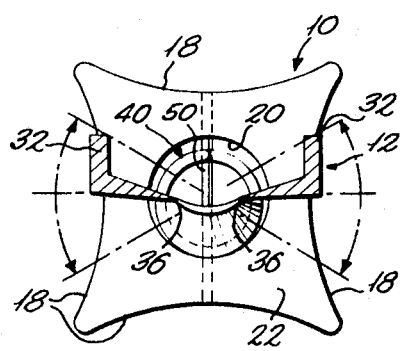
FIG. 4 is a sectional view on an enlarged scale taken substantially along line 4—4 of FIG. 1 looking in the direction of the arrows.

As seen most clearly in FIGS. 1, 2 and 4, the blade portion is of conventional construction and includes a relatively sharp end portion 30, the main body of the blade having a pair of upstanding flanges 32 formed thereon. An elongated slot 34 is provided centrally within the blade portion and is provided with a pair of cutting edges 36 at opposite sides thereof as is conventional in the art.

The blade portion includes a connecting portion in the form of a split cylindrical connector ferrule indicated indicated generally by reference numeral 40. As seen most clearly in FIG. 3, the unique means for securing the blade portion to the handle portion includes a pair of holes 42 and 44 provided in the connecting portion at substantially diametrically opposite sides thereof.

A pin 50 extends diametrically across the cylindrical hole 20 within the handle portion and as seen most clearly in FIG. 3 is tightly fitted within holes 52 and 54 provided in opposite sides of the handle portion. This arrangement enables the blade potrion to be secured to the handle portion in a most simple and economical manner and further enables ready cleaning thereof as will hereinafter be more fully explained.

In order to assemble the apparatus of the present invention, the connecting portion 40 is simply inserted through the open end of hole 20 and a pin 50 is then driven into place as seen in FIG. 3 thereby providing a lost motion connection between the blade portion and the handle portion. It will be noted that the holes 42 and 44 are of substantially greater size than the diameter of the pin 50 thereby permitting rotation of the blade portion with respect to the handle portion and precisely determining the maximum arc of movement of the blade portion. Also as seen in FIG. 4, the arrows indicate the degree of relative rotation permitted between the handle portion and the blade portion.

It is apparent from the foregoing that there is provided according to the present invention a new and novel vegetable peeler wherein the blade portion is mounted for rotation with respect to the associated handle portion so that the blade portion can readily conform to the outer configurations of different shaped items. The outer configuration of the handle portion is such as to prevent slippage of the handle portioon with respect to the hand of a user. The hole extending throughout the length of the handle portion permits water to be introduced through the hole 20 at the end 24 of the handle portion so that water may pass through the hole and thoroughly cleanse the lost motion interconnection between the handle portion and the blade portion as well as all of the blade portion surface.

The construction is such that the handle portion may be very inexpensively manufactured due to the fact that it comprises a relatively simple extruded one-piece construction. The peeler may be readily employed either with the left or the right hand of a user and may be moved either forward or backward to perform the desired cutting function.

I claim:

1. A vegetable peeler comprising an elongated handle portion, an elongated blade portion having cutting edge means, and means interconnecting said handle portion and said blade portion to provide a lost motion connection therebetween permitting rotation of said blade portion with respect to said handle portion, said blade portion includes a connecting portion, said handle portion having a hole extending longitudinally therethrough and opening through opposite ends thereof, one end of said hole receiving said connecting portion, said connecting portion having hole means formed therethrough, said handle portion having a hole therein receiving said connecting portion, and a pin supported by said handle portion and extending through said hole means, said hole means being of substantially many times greater size than the cross sectional area of said pin to permit relative radial and axial movement of the connecting portion of the blade portion relative to the handle, said connecting portion further being substantially cylindrical and said hole means comprising holes formed at diametrically opposite portions of said connecting portion, said hole in the handle portion also being substantially cylindrical and being of greater diameter than the connecting portion to permit relative sideway movement of the connecting portion with respect to the handle portion.

References Cited
UNITED STATES PATENTS

| | | | |
|---|---|---|---|
| 297,748 | 4/1884 | Brock | 30—278 |
| 2,232,940 | 2/1941 | Fender | 30—278 |
| 2,240,410 | 4/1941 | Murdock | 30—278 |
| 2,264,196 | 11/1941 | Carlson | 30—278 |
| 2,351,327 | 6/1944 | Gamache | 30—279 |
| 2,577,406 | 12/1951 | Crandell | 30—279 X |
| 3,186,088 | 6/1965 | Lingenfelter | 30—279 |

ROBERT C. RIORDON, Primary Examiner

T. C. PETERS, Assistant Examiner